United States Patent [19]

Barnhart et al.

[11] Patent Number: 4,581,288

[45] Date of Patent: Apr. 8, 1986

[54] COMPOSITE PHOTOCHROMIC LENSES

[75] Inventors: Kenneth T. Barnhart, Corning; Carlo M. Golino, Caton; Candace J. Quinn, Corning, all of N.Y.

[73] Assignee: Corning Glass Works, Corning, N.Y.

[21] Appl. No.: 694,081

[22] Filed: Jan. 23, 1985

Related U.S. Application Data

[63] Continuation-in-part of Ser. No. 543,970, Oct. 20, 1983, abandoned.

[51] Int. Cl.$^4$ .................... B32B 27/04; G02B 27/00
[52] U.S. Cl. .................................. 428/325; 350/354; 351/163; 428/913
[58] Field of Search ................ 428/325, 913; 350/354; 351/163; 252/586

[56] References Cited

U.S. PATENT DOCUMENTS

| 4,049,567 | 9/1977 | Chu et al. | 350/354 |
| 4,168,339 | 9/1979 | Kerko et al. | 350/354 |
| 4,300,821 | 11/1981 | Mignen | 350/354 |
| 4,444,939 | 4/1984 | Postle et al. | 428/325 |

FOREIGN PATENT DOCUMENTS 2112668  7/1983  United Kingdom .

Primary Examiner—Paul J. Thibodeau
Attorney, Agent, or Firm—C. S. Janes, Jr.

[57] ABSTRACT

The instant invention is concerned with the production of essentially transparent glass/plastic composite articles. The articles consist of glass particles having water-free surfaces and dimensions of about 0.5–100 microns dispersed within a plastic matrix, the glass particles constituting up to 50% by weight of the articles and having a refractive index appropriate to or compatible with the plastic matrix.

4 Claims, No Drawings

COMPOSITE PHOTOCHROMIC LENSES

This application is a continuation-in-part application of Ser. No. 543,970 filed Oct. 20, 1983, and now abandoned.

BACKGROUND OF THE INVENTION

Photochromism or phototropism, as the phenomenon has been variously termed, has been long known to science. Thus, certain naturally-occurring materials, e.g., titanium dioxide and Hackmanite, undergo a color change when exposed to light of one wavelength, followed by a reversion to their original color in the dark or on irradiation with light of a different wavelength. Also, families of organic compounds exhibiting photochromic behavior, such as the fulgides and spiropyrans, have been synthesized. One rather recent development has been the production of glass articles, most notably ophthalmic lenses, demonstrating photochromic properties.

U.S. Pat. No. 3,208,860 comprises the practical foundation for the development of photochromic glasses. That patent broadly discloses the incorporation of silver halide crystallites selected from the group of silver chloride, silver bromide, and silver iodide in silicate-based glass compositions to yield glass articles which darken (change color) when exposed to ultraviolet radiation and regain their original transmittance when removed from the ultraviolet radiation. The silver halide particles are postulated to react in some manner with the ultraviolet radiation but, being encased within a glass matrix, the reaction products cannot leave the vicinity of the crystallites such that, when the ultraviolet radiation is removed, the reaction products are available for recombination. Because of the essential hardness and rigidity of the glass matrix, the photochromic behavior of the glass articles is not subject to fatigue. That is, the degree of darkening and lightening is not altered by repeated exposures to and removals from ultraviolet radiation. That characteristic is of extreme importance in the fabrication of ophthalmic lenses since,, to date, all organic materials used to fabricate photochromic ophthalmic or plano (non-prescription) lenses have met with failure, in that they have exhibited fatigue after a relatively few cycles of darkening and lightening, thereby losing their photochromic properties.

Whereas lenses prepared from organic plastics are much more prone to scratching in use than glass lenses and do not have the range of refractive indices that are available in glass lenses, they nevertheless have made inroads into the traditional glass markets of ophthalmic and plano eyeware, principally because of their light weight. This difference in density is of special interest to persons requiring prescriptions of very high power, which necessitates lenses of substantial thickness.

Since research to date has not discovered an organic compound evidencing photochromic behavior which does not fatigue, numerous schemes have been devised to in some manner combine inorganic photochromic materials with plastics, or to envelope organic and inorganic photochromic particles in protective coatings and then disperse those particles in a plastic matrix, or to hermetically seal a photochromic organic material within an organic envelope.

For example, U.S. Pat. Nos. 3,932,690, 4,168,339, and 4,300,821 are drawn to the fabrication of laminated articles wherein a layer of an inorganic material demonstrating photochromic behavior, either a sheet of glass or a layer of crystals, is buried within an organic plastic mass. Hence, U.S. Pat. No. 4,168,339 discloses the use of photochromic glass microsheet as the buried layer and U.S. Pat. No. 4,300,821 utilizes a mat of photochromic fiber glass for the same purpose. U.S. Pat. No. 4,168,339 also notes that, instead of burying the photochromic microsheet into a plastic mass, it may be bonded to the surface of a plastic mass which thereby protects the plastic from abrasion. U.S. Pat. No. 3,932,690 is directed to a three or four ply laminated article consisting of a glass or plastic substrate, a photochromic layer comprising silver and copper halide crystals, a plastic sheet, and, optionally, a glass or plastic sheet bonded to the plastic sheet.

U.S. Pat. No. 3,508,810 describes a laminated structure consisting of a pair of glass sheets sealed together with a resin containing an organic photochromic material dissolved therein.

U.S. Pat. Nos. 3,875,321, 3,950,591, and 4,035,527 are concerned with means for applying a glassy or crystalline coating of an inorganic photochromic material on the surface of an organic plastic substrate. Vapor deposition appeared to constitute the preferred process of application, although other methods such as dipping, flame spraying, and sputtering were also observed as being operable.

U.S. Pat. Nos. 4,012,232, 4,046,586, 4,049,567, and 4,049,846 discuss several methods for incorporating organic and inorganic particles exhibiting photochromic behavior into plastic matrices. U.S. Pat. No. 4,012,232 discloses enveloping photochromic organic particles in protective inorganic coatings and then dispersing the coated particle in a plastic matrix. U.S. Pat. No. 4,046,586 describes enveloping photochromic inorganic halide crystals, preferably silve halide crystals, in inorganic non-oxide coatings, and thereafter incorporating the coated crystals into a plastic mass. U.S. Pat. No. 4,049,567 is concerned with growing silver halide crystals in an organic polymer environment, the polymer chosen having the capability of preventing the silver halide crystals from growing beyond a particle size of 1000 Å; the environment also containing a sufficient amount of plasticizer to render the final plastic mass non-brittle. U.S. Pat. No. 4,049,846 is drawn to a method comprising the steps of forming a polymeric shape from a mixed polymer, swelling a surface layer on the polymeric shape with a polar solvent, absorbing silver and halide ions into the swelled surface layer, and then collapsing the surface layer by removing the solvent therefrom.

Each of the above disclosures is directed to the production of transparent products. However, those products have been plagued by various problems.

For example, other than fatigue experienced with the organic photochromic materials, the development of a strong, permanent bond between a glass sheet and a plastic substrate which will resist temperature and humidity changes in the service environment has proven difficult, and the elimination of haze due to light scattering from photochromic particles incorporated in the plastic mass has been perplexing. An extreme illustration of the latter problem is provided in U.S. Pat. No. 4,134,853. That patent describes the dispersion of very fine crystals, prepared by calcining a mixture of $TiO_2$, FeO, and PbO which displays photochromic behavior, into a plastic mass. The plastic mass is shaped into a toy, such as a doll, which will appear to tan when exposed to sunlight. The final product is opaque even through the photochromic particles are reduced to sub-micron dimensions.

Nevertheless, in view of the extensive research disclosed in the above patent literature and the problems that have been witnessed with the articles resulting therefrom, it was determined that the ideal product would comprise a composite body consisting of photochromic glass particles dispersed within a plastic mass. Thus, a number of advantages in fabricating procedures and in the physical properties exhibited by the final body can be enjoyed in a composite product consisting of photochromic glass particles incorporated in a plastic mass, when compared with a glass-plastic laminate. For example, fabrication of a composite ophthalmic lens would make use of bulk glass (which is milled into a powder), rather than requiring the production of optical quality microsheet. That circumstance means that glass manufacture and subsequent heat treatment to develop photochromic properties therein are easier, and fewer forming constraints are imposed on the glass composition. That latter feature is of particular advantage in that essentially any inorganic photochromic glass composition would be operable. For example, microsheet exhibiting uniform photochromic properties is difficult to form from certain cadmium halide-containing glass compositions, such as are disclosed in U.S. Pat. Nos. 3,325,299 and 4,166,745, because the photochromic properties thereof are quite sensitive to cooling rates during forming. Uniformity, however, is improved in glass articles of substantial cross section and further homogenization can be achieved when the glass body is triturated. Furthermore, fabrication of a composite body is simpler than forming a laminated article. The principal advantage of such a composite body, when compared with a laminated structure, is the absence of delamination problems. Finally, the presence of the glass particles improves the resistance of the plastic mass to abrasion.

OBJECTIVES OF THE INVENTION

The primary objective of the instant invention is to produce essentially transparent composite articles consisting of glass particles dispersed in an organic plastic mass.

A specific objective is to produce such articles wherein said particles consist of photochromic glass.

An even more specific objective is to produce such articles in the configuration of photochromic ophthalmic and plano lenses.

SUMMARY OF THE INVENTION

The likelihood of success in developing the desired composite articles was not deemed high for three reasons: (1) initial experiments produced composites exhibiting significantly reduced visible transmittance due to the presence of haze which varied with temperature; (2) it was theorized that substantial haze would invariably be present since visible light would be scattered at the glass particle/plastic matrix interface resulting from different indices of refraction of the glass and plastic; and (3) it was conjectured that matching of the refractive indices of the glass and plastic could not be achieved over any significant range of temperatures due to the large thermal expansion of the plastic compared to that of the glass.

We have discovered that the degree of haze in such composite articles is a function of the mode of preparation thereof and is largely related to poor bonding at the glass/plastic interface. Hence, the most critical parameters in processing are: (a) the presence of water on the surface of the glass particles (which inhibits bonding between the particles and the plastic); (b) the size of the glass particles (primarily through the relationship of surface area to particle size); and (c) trapped air at the particle/plastic interface.

The absence of water from the surface of the glass particles can be achieved through such means as drying the particles at elevated temperatures to drive off surface-adsorbed water, washing the particles in an organic liquid which is miscible in water, or comminuting the bulk glass in a liquid, non-aqueous medium, desirably the plastic which will comprise the matrix of the composite, to thereby coat the freshly-fractured glass surfaces and eliminate any contact between the glass particles and moisture in the ambient atmosphere.

Particle sizes within the range of about 0.5-100 microns have been found to be operable, the most preferred varying between about 10-50 microns. Particles of smaller dimensions have higher surface areas and, consequently, are more difficult to dry and maintain free from adsorbed gases and contaminants picked up during milling or other particle-reducing operations. Larger particles evidence a significant tendency to settle out when blended into the plastic matrix such that maintenance of a uniform dispersion becomes a serious problem.

The desired essentially transparent photochromic composite articles can be prepared via the following general steps:

(1) a body of potentially photochromic glass having a refractive index appropriate to, i.e., closely matching, the intended plastic matrix, normally within the range of about ±0.002, is formed. (The expression potentially photochromic indicates that the glass as formed exhibits little, if any, photochromic behavior, photochromism being developed through heat treatment of the glass. It is possible to cool the freshly-shaped glass body in such a manner that photochromism is generated therein, but, because of the difficulty in closely controlling the development of photochromism thereby, the much preferred practice has involved subjecting a body of potentially photochromic glass to a subsequent, carefully-defined heat treatment.)
(2) The glass body is heat treated to develop photochromic behavior therein.
(3) The photochromic glass body is milled or otherwise comminuted to a powder in the ambient environment.
(4) The desired particle size fraction of the powdered glass is separated, e.g., by screening.
(5) Adsorbed water is removed from the separated fraction of glass particles; e.g., by high temperature drying or by washing in an organic liquid miscible with water.
(6) The water-free particles are mixed with the plastic matrix material present in the liquid state or in particulate form.
(7) The mixture is subjected to a vacuum to remove entrapped air.
(8) The mixture is formed into a shape of a desired geometry, e.g., through casting into the lens mold or through such molding means as injection molding, compression molding, extrusion or isostatic pressing.
(9) The plastic matrix material is cured.

Several modifications of that general series of operations are possible. For example:

(a) Instead of heat treating the potentially photochromic glass body in bulk form, i.e., prior to trituration to a powder, the powder can be dried and heat treated simultaneously after the particle reduction process.

(b) Instead of comminuting the glass in the ambient environment, that operation may be undertaken in the presence of the plastic matrix material in the liquid state and the desired particle size fraction separated through wet screening or settling techniques (a function of the viscosity of the liquid and the density of the glass). Step (5) can be eliminated when this modification of the basic general procedure is employed.

(c) The glass particles can be acid washed to remove surface contamination, enhance bonding, and, perhaps, impart a gradient index effect.

(d) Adsorbed water may be removed and the bond between the glass particles and the plastic matrix may be improved through the use of surfactants or by treating the glass particles with a silane, titanate, or other organometallic coupling agent.

(e) When a molding means is employed to form a mixture containing a thermoplastic resin into a desired shape it may be convenient to combine Steps (8) and (9). For example, through hot compression molding or hot isostatic pressing the shaping and curing, if required, can be accomplished simultaneously under the influence of heat and pressure.

As can be appreciated, in such applications as lenses for eyeware the desire has been for light weight products. Accordingly, such lenses will contain only that amount of photochromic glass particles which is sufficient to impart the desired overall photochromic behavior thereto.

Therefore, whereas essentially transparent composite articles have been prepared with glass particles comprising up to 50% by weight, such loadings far exceed the amount required for desired photochromic properties. Hence, a loading of 20% by weight is equivalent to microsheet of about 0.010" cross section and a 30% by weight content is equivalent to microsheet of about 0.015" thickness. Consequently, loadings of about 20% by weight glass particles have been deemed optimal for a wide range of glass compositions, although certain copper-cadmium halide-containing glasses which exhibit high surface darkening can be successfully employed in amounts as low as 5-10%.

The tendency of the glass particles to settle out from the suspension in the uncured plastic matrix may be utilized to advantage, where desired. For example, as has been observed above, the proper particle size fraction can be separated from the powdered glass by allowing the suspension to stand for a predetermined length of time. Settling can also be used to devise a gradient photochromic lens rather than one of uniform properties throughout. Hence, semifinished lenses with improved polishing characteristics can be produced by choosing a plastic viscosity and glass particle size such that, when the glass-plastic suspension is cast into the mold, the particles are permitted to settle out, i.e., the particles will settle toward the front, finished surface of the lens. After curing the plastic, the back surface of the lens can then be ground and polished to prescription without experiencing any "pulling out" of glass particles from the plastic matrix.

This "pulling out" of glass particles can have a devastating effect upon the transparency exhibited by the lens. Scanning electron microscopy studies of lenses demonstrating different levels of haze have indicated that the clearer products contain larger, better-bonded particles. The very small glass particles in the hazy bodies were observed to pull out of the plastic matrix. In the extreme case, a void between the glass particle and the plastic results in a dramatic index step with consequent very high light scattering. Those studies serve to emphasize that the development of haze is, in part, a function of the bonding existing between the glass particles and the plastic matrix. The above studies could also lead to the hypothesis that the effect of particle size might merely be that the area of glass/plastic interface, i.e., the area where light scattering occurs, is a function of the particle size at constant weight loading of glass.

It has also been observed that the size of the glass particles exerts a profound effect upon the development of haze as a function of temperature. Thus, products containing very small glass particles are much more susceptible to haze buildup upon changes of temperature. Again, however, it can be conjectured that the weak bonding between the glass particles and the plastic matrix, in contrast to the change in refractive index of the plastic with temperature, is the critical parameter. Accordingly, where the bonding is poor, the plastic, having a much higher thermal expansion than the glass, is prone to pull away from the glass particle upon heating. That phenomenon causes haze to develop as voids open at the glass/plastic interface.

PRIOR ART

U.S. Pat. No. 4,444,939 is directed to the production of a water-based paint exhibiting photochromic behavior, the paint consisting of a latex of an acrylate and/or a methacrylate polymer which has dispersed therein photochromic glass beads having dimensions of 0.05-1 micron and which comprise 10-30% by weight of the glass/latex mixture.

Inasmuch as the patented paints are water-based, there is quite apparently no requirement that the surfaces of the glass particles be water free. Furthermore, there is no indication that the patented paints form a transparent layer, that the patented paints are free from trapped air and voids; and that the refractive index of the organic component of the paint closely matches that of the glass beads.

U.S. Pat. No. 4,300,821 describes the fabrication of an ophthalmic lens wherein a fibrous mat of photochromic glass is embedded within an organic plastic matrix. No reference is made to glass particles. There is no requirement that the fibrous mats be free from adsorbed water or that the final product be free from trapped air and voids.

U.K. Patent Application No. 2,112,668 A discloses a product consisting of an organic plastic sheet coated with a colloid binder which contains photochromic glass beads having dimensions of 0.05-50 microns dispersed therein; the glass beads constituting 10-40% by weight of the binder and the refractive indices of the glass and colloid binder being closely matching.

Since the colloid binder solution may be aqueous, there is no requirement that the glass beads be free from adsorbed water. Moreover, there is no demand that the final product be free from entrapped air and voids.

DESCRIPTION OF PREFERRED EMBODIMENTS

A potentially photochromic glass having the composition reported below, expressed in terms of parts by weight on the oxide basis, was melted in a small laboratory continuously-melting unit and lens blanks pressed from the melt. Because it is not known with which cations the halides are combined, and because the levels thereof are so low, they are merely recited in terms of halides, in accordance with conventional glass analysis practice. Furthermore, inasmuch as the sum of the values of the individual components closely approximates 100, for all practical purposes the amount of each recorded may be deemed to reflect weight percent. The actual batch ingredients may comprise any materials, either oxides or other compounds, which, when melted together, will be converted into the desired oxides in the proper proportions.

$SiO_2$: 56.2
$Al_2O_3$: 10.5
$B_2O_3$: 20.5
$Na_2O$: 9.0
BaO: 2.5
$TiO_2$: 0.5
F: 0.8
CdO: 1.5
Cl: 0.8
CuO: 0.25
SnO: 0.25
Ag: 0.035

The glass slab was dry ballmilled, utilizing $Al_2O_3$ balls, and particle fractions separated through screening as reported in the table below, viz., particles passing a No. 400 United States Standard Sieve (37 microns) and particles passing a No. 140 United States Standard Sieve (105 microns), but resting on a No. 400 screen. The particles passing the No. 400 screen were considered to have an average particle size of about 10 microns.

Lenses of 2 mm thickness were prepared by thoroughly blending those fractions into liquid, partially-polymerized CR-39 resin, casting the resulting mixture into a mold and curing the resin. CR-39 is a thermosetting plastic with a refractive index of about 1.504 made from diethylene glycol bis(allyl carbonate)monomer which has been employed extensively in ophthalmic applications. The refractive index of the glass was also about 1.504. In each instance the loading of glass particles was 20% by weight.

As recorded in Table I below, the first set of lenses was formed from as-received −400 mesh glass powder. The resultant lenses transmitted an average of only about 2-4% of the incident light at room temperature ($T_o$). The second set of lenses was prepared from −400 mesh glass powder which had been dried at 450° C. for 20 minutes and then cooled in a desiccator before blending into the partially-polymerized CR-39 resin. Those lenses transmitted an average of about 64% of the incident light at room temperature. The third set of lenses was produced from the glass particle fraction −140+400 mesh which had also been dried at 450° C. for 20 minutes and cooled in a desiccator before mixing in the resin. Those lenses transmitted an average of about 87% of the incident light.

The second and third sets of lenses were heated to 95° C. and then cooled to room temperature ($\Delta T$, RT 95° C.). The average transmittance of incident light of the second set of lenses was only about 28%, a loss of 36%, whereas the average transmittance of the incident light of the third set was about 81%, a loss of only 6%.

TABLE I

| Sample | Particle Size | Dried | $T_o$ | $\Delta T$, RT 95° C. |
|---|---|---|---|---|
| A | −400 mesh | No | 2-4% | — |
| B | −400 mesh | Yes | 65% | 36% |
| C | −140 + 400 mesh | Yes | 87% | 6% |

An examination of the above data indicates that transparency can be achieved through a combination of particle size and removal of adsorbed surface water from the particles.

As a matter of convenience, Samples A, B, and C were prepared from a potentially photochromic glass composition of the type described in U.S. Pat. No. 4,076,544. Thus, levels of haze can be more accurately determined on glasses in the undarkened state. The glasses of U.S. Pat. No. 4,076,544 are especially suitable for use in the inventive composites inasmuch as they are surface darkening, i.e., they darken quite deeply in a layer of only a few microns within the glass surface. That quality permits good photochromic properties to be imparted to the composite bodies with low glass particle loadings. Most usually, a potentially photochromic glass will be heat treated to develop photochromism prior to being combined with the organic material, because the heat treatment temperatures required frequently exceed those levels at which the organic material maintains stability.

Lenses of 2 mm thickness were also prepared from dried glass particles of the following composition, expressed in terms of parts by weight on the oxide basis:

$SiO_2$: 53.1
$Al_2O_3$: 9.0
$B_2O_3$: 21.6
$Li_2O$: 2.8
$Na_2O$: 5.7
CdO: 3.3
CuO: 0.5
F: 1.3
Cl: 2.6

The particles, sized to pass a No. 270 United States Standard Sieve (53 microns) and rest upon a No. 325 United States Standard Sieve (44 microns), were blended with dried beads of a polymethylmethacrylate marketed by Fisher Scientific Company as M215; the glass particles comprising 10% by weight of the mixture. That mixture was charged into a press having polished, removable pistons and compression molded at a temperature of 190° C. and pressure of 300 psi to form pore-free lenses exhibiting the optical transmission reported in Table II below. The glass powders of Sample E were coated with phenyl triethoxysilane prior to being mixed with the dried beads of polymethylmethacrylate.

TABLE II

| Sample | Silane | $T_o$ | $\Delta T$ RT-60° C. |
|---|---|---|---|
| D | No | 85% | 5% |
| E | Yes | 88% | 4% |

As can be seen, the application of a silane to the glass particles appears to provide an improvement in lens clarity.

The base composition of the glass is not critical to the operability of the invention (so long as no reaction takes place between the glass and the organic material). Hence, the glass may be photochromic or non-photochromic; it is only necessary that the particles thereof have water-free surfaces, have dimensions ranging between about 0.5-100 microns, and have a refractive index appropriate to or compatible with the plastic. This broad scope of functioning compositions permits the use of essentially limitless varieties of photochromic glasses; for example, glasses described in U.S. Pat. No. 3,208,860, U.S. Pat. No. 3,293,052, U.S. Pat. No. 3,325,299, U.S. Pat. No. 3,615,771, U.S. Pat. No. 3,328,182, U.S. Pat. No. 3,630,765, U.S. Pat. No. 3,703,388, U.S. Pat. No. 3,876,436, U.S. Pat. No. 3,902,909, and U.S. Pat. No. 4,166,745 can be considered for this application.

Likewise, whereas CR-39 resin has been utilized most extensively in eyeware application, other organic plastics capable of being prepared in optical quality are also operable. Such materials would include homopolymers of the esters of acrylic acid and methacrylic acid (commonly referred to as acrylics) the most common example being polymethylmethacrylate described above and marketed under such trade names as "Plexiglas" and "Lucite". Other homopolymers such as the polystyrenes, the polycarbonates (e.g., "Lexan"), polymethylpentene (e.g., TPX), and certain epoxies, either homopolymerized or crosslinked by an added co-reactant such as an amine can be prepared in optical quality and would also be operable.

A very large number of copolymers can be prepared in optical quality. Examples of such include: poly(styrene-acrylonitrile); poly(sytrene-acrylic) materials; acrylic copolymers such as poly(methylmethacrylate-cyclohexylmethacrylate); materials produced from the copolymerization of CR-39 monomer [diethylene glycol bis(allyl carbonate)] with various acrylic monomers (in particular methylmethacrylate); and copolymers from the copolymerization of acrylics with acrylic acid or methacrylic acid. The preceding recitation of operable copolymers should be deemed illustrative only, not limitative. For example, terpolymers which can be prepared in optical quality would also be operable.

To illustrate the use of co-polymer matrices, two lenses of 2 mm thickness were prepared by blending particles of a photochromic glass composition of the type described in U.S. Pat. No. 4,168,339, the powders passing a No. 270 United States Standard Sieve and resting upon a No. 325 United States Standard Sieve to yield an average particle size of about 55 microns, into a prepolymerized, liquid formed from 60% by weight CR-39 monomer, 40% by weight methylmethacrylate monomer, the glass particles being coated with γ-methacryloxypropyltrimethoxysilane to eliminate water from the surfaces thereof prior to blending into the liquid. The mixture was introduced into a vacuum desiccator and the desiccator evacuated for 15 minutes at ambient temperature. Thereafter, the mixture was cast into a mold and cured. Both the glass and the copolymer matrix exhibited a refractive index of about 1.496. In the first lens the loading of glass particles was 10% by weight, and the second lens contained 25% by weight of glass particles.

Table III reports photochromic properties measured on the above lenses. The $T_o$ legend indicates the initial (undarkened) transmission of the lens; the $T_{D10}$ symbol designates the transmission of the lens after exposure to two 15-watt black-light blue fluorescent lamps for a time interval of 10 minutes; and $T_{F5}$ signifies the transmission of the lens after removal from exposure to the ultraviolet radiation provided by the fluorescent lamps for five minutes.

TABLE III

|  | 10% Glass | 25% Glass |
| --- | --- | --- |
| $T_o$ | 88% | 81% |
| $T_{D10}$ | 66% | 47% |
| $T_{F5}$ | 81% | 69% |

With certain silver-containing glass compositions, an undesirable discoloration or graying has been observed when the glass particles are mixed with organic liquids such as CR-39 monomer. It has been postulated that this coloration is the result of an irreversible reduction of silver ions to colloidal silver metal at the surface of the glass particles. Consequently, care will be exercised to utilize the proper environment to maintain the silver in the ionic state. It has also been found that changes in the glass chemistry and in the thermal history to which the glass is exposed can be employed to eliminate that reaction.

We claim:

1. An essentially transparent glass/plastic composite body free from trapped air and voids consisting of particles of a glass having dimensions between about 0.5-100 microns and water-free surfaces and being dispersed within a plastic matrix, said glass particles comprising up to 50% by weight of said composite body and having a refractive index within the range of about ±0.002 of the plastic matrix.

2. An essentially transparent glass/plastic composite body according to claim 1 wherein said glass particles have dimensions between about 10-50 microns.

3. An essentially transparent glass/plastic composite body according to claim 1 wherein said glass particles comprise about 5-30% by weight of said composite body.

4. An essentially transparent glass/plastic composite body according to claim 1 wherein said glass exhibits photochromic properties.

* * * * *